United States Patent
Smith

(10) Patent No.: US 7,320,514 B2
(45) Date of Patent: Jan. 22, 2008

(54) AUXILIARY EYEWEAR ASSEMBLY WITH MICROMAGNETIC ATTACHMENT

(75) Inventor: Greg Smith, Plano, TX (US)

(73) Assignee: E'lite Optik U.S. L.P., Carrolton, TX (US)

( * ) Notice: Subject to any disclaimer, the term of this patent is extended or adjusted under 35 U.S.C. 154(b) by 0 days.

(21) Appl. No.: 11/273,133

(22) Filed: Nov. 14, 2005

(65) Prior Publication Data

US 2006/0126007 A1   Jun. 15, 2006

Related U.S. Application Data

(60) Provisional application No. 60/627,451, filed on Nov. 12, 2004.

(51) Int. Cl.
*G02C 9/00* (2006.01)

(52) U.S. Cl. .......................... 351/47; 351/57

(58) Field of Classification Search ............ 351/47, 351/48, 57, 58, 44, 41, 158
See application file for complete search history.

(56) References Cited

U.S. PATENT DOCUMENTS

| | | | |
|---|---|---|---|
| 3,238,005 A | 3/1966 | Petitto | |
| 3,252,747 A | 5/1966 | Robins | |
| 4,070,103 A | 1/1978 | Meeker | |
| 5,416,537 A | 5/1995 | Sadler | |
| 5,568,207 A | 10/1996 | Chao | |
| 5,786,880 A | 7/1998 | Chao | |
| 6,089,708 A | 7/2000 | Ku | |
| 6,301,953 B1 | 10/2001 | Zamfes | |
| 6,331,057 B1 | 12/2001 | Strube | |
| 6,375,321 B1 | 4/2002 | Lee et al. | |
| 6,412,942 B1 | 7/2002 | McKenna et al. | |
| 6,474,811 B2 | 11/2002 | Liu | |
| 6,776,481 B2 | 8/2004 | Ng | |
| 6,783,238 B1 * | 8/2004 | Stepper | 351/178 |
| 6,893,124 B1 * | 5/2005 | Kurtin | 351/57 |
| 7,144,108 B2 | 12/2006 | Lee | |

OTHER PUBLICATIONS

"Standard Specifications for Permanent Magnet Materials," MMPA Standard No. 0100-00, Magnetic Materials Producers Assn., Chicago, IL (originally published 1964).

* cited by examiner

*Primary Examiner*—Hung Xuan Dang
(74) *Attorney, Agent, or Firm*—John G. Fischer; Storm LLP

(57) ABSTRACT

Primary and auxiliary lens assemblies are provided that allow a wearer easy usage with a reduced risk of misalignment or detachment through the use of micromagnets. Conventional magnetic auxiliary lens assemblies are difficult to manufacture and functionally limited due to the limitations of conventional magnets and the composition of the auxiliary frames. The improved lens assemblies disclosed herein instead employ high strength micromagnets advantageously aligned and embedded in the auxiliary lens frame to improve the ease and reliability of coupling to a primary frame, and to provide aesthetic and functional advantageous over the known art.

15 Claims, 8 Drawing Sheets

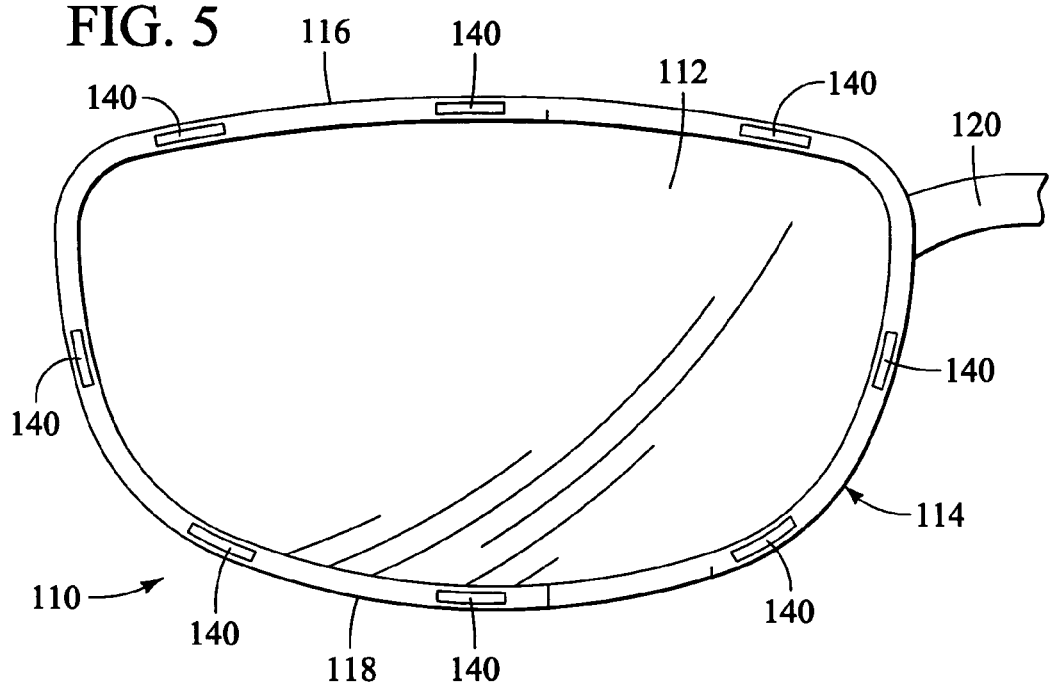
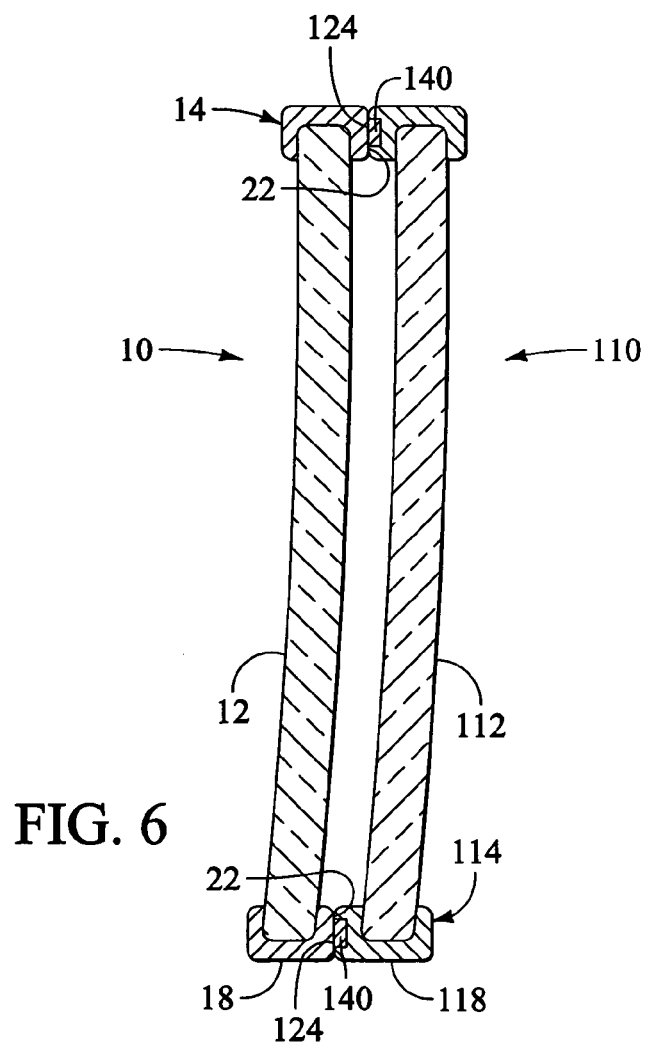

AUXILIARY EYEWEAR ASSEMBLY WITH MICROMAGNETIC ATTACHMENT

CLAIM OF PRIORITY

This application claims priority from U.S. Provisional Patent Application No. 60/627,451 entitled "AUXILIARY EYEWEAR ASSEMBLY WITH MICROMAGNETIC ATTACHMENT" filed on behalf of Greg Smith on Nov. 12, 2004, and is hereby incorporated by reference for all purposes.

TECHNICAL FIELD OF INVENTION

The present invention relates to eyewear and, in particular, to an eyewear assembly that incorporates an auxiliary lens assembly for removable attachment to a primary lens assembly. Still more specifically, the present invention relates to an auxiliary lens assembly configured for micromagnetic attachment to a primary lens assembly.

BACKGROUND OF THE INVENTION

It has long been desirable to have a removable auxiliary lens assembly attached to eyeglasses. Professional baseball players have used "flip-up" auxiliary lenses for more than four decades to protect their eyes from the sun, but to allow them unrestricted vision in the event the ball was hit in their vicinity.

U.S. Pat. No. 3,252,747 to Robins ("Robins") discloses an eyewear system specifically designed for persons who are farsighted. The device includes an assembly in which an auxiliary frame assembly containing lenses may be rotated about the horizontal axis and remain attached to a primary assembly so as to locate the lenses the proper distance to the eyes every time the device is lowered into place. A significant disadvantage of this design is that it is unattractive, overly complicated, impossible to segregate from the primary frame, and does not permit or accommodate anyone other than farsighted individuals.

U.S. Pat. No. 6,089,708 to Ku ("Ku") discloses a connecting member having spaced connecting plates for attachment to the bridge portion of a primary lens assembly. The connecting plates have magnetic members that act cooperatively with a complimentary magnetic member inserted in a hole on the bridge. The front of the connecting part has an open communication to a polygonal shaped holding room. The auxiliary frame has connecting rods extending above the bridge portion, and supporting an intermediate portion having a polygonal shape, receivable and rotatable in the holding room. A significant disadvantage of this design is that it is unattractive, overly complicated, and resists easy and immediate removal of the auxiliary lens assembly.

U.S. Pat. No. 3,238,005 to Petitto ("Petitto") discloses the combination of a primary lens assembly and auxiliary lens assembly. The auxiliary assembly has flexible sidewall projections with openings that can be assembled onto lugs (pins) extending perpendicularly from the sides of the primary assembly, allowing the auxiliary assembly to be pivoted upwards, and back downwards. Leaf springs mounted on the auxiliary assembly engage surfaces of the primary assembly to urge the auxiliary assembly into position. A significant disadvantage of this design is that it is unattractive, overly complicated, and resists easy and immediate removal of the auxiliary lens assembly.

As stated, these and other mechanically clipped on devices for holding auxiliary lenses are cumbersome and unattractive. More recently, numerous attempts have been made to magnetically attach an auxiliary lens assembly to a primary lens assembly.

U.S. Pat. No. 4,070,103 to Meeker ("Meeker"), in one embodiment discloses a primary lens assembly having a slidably attachable auxiliary lens assembly. In this device, the primary lens assembly is made of magnetizable material and auxiliary lenses are individually securable to the primary lens assembly by a magnetic band inserted in a groove on the inside surface of the individual auxiliary lens assembly. This design is not pivotal, and the auxiliary assembly must be physically removed.

U.S. Pat. No. 5,416,537 to Sadler ("Sadler") discloses a primary lens assembly having a first magnetic member attached vertically to the front surface of the primary lens assembly, and a second magnetic member attached in a corresponding position on the back surface on an auxiliary lens assembly. The magnetic members are arranged for engagement to secure the auxiliary lens assembly to the primary lens assembly. This design is not pivotal, and the auxiliary assembly must be physically removed.

U.S. Pat. No. 5,568,207 to Chao ("Chao"), in one embodiment, also discloses a magnetically adhered auxiliary lens assembly, with the additional feature of arms extending from the side portions of the auxiliary lens assembly, over magnet retaining projections and extensions of the primary lens assembly. The arms engage with, and are supported on, the primary lens assembly extensions to prevent disengagement of the auxiliary lens assembly upon downward movement of the auxiliary lens assembly relative to the primary lens assembly. This design is not pivotal, and the auxiliary lens assembly must be physically removed.

Many of the recent developments in auxiliary eyewear systems such as those described above rely on a combination of mechanical and magnetic engagement. The magnetic engagements themselves are insufficiently strong to retain the auxiliary frame assembly. Additionally, the auxiliary frame assembly must be removed from the primary frame assembly, and then handled and stored separately when it is necessary for the eyeglass wearer to look only through the lenses of the primary frame assembly. They do not enjoy the advantages of the early flip-up designs, which permitted quick movement of the auxiliary assembly out of alignment with the primary assembly without separating them from the primary assembly.

U.S. Pat. No. 6,474,811 to Liu ("Liu") discloses a magnetically attached auxiliary lens assembly in which the auxiliary assembly can be magnetically attached to either the inside or outside of extensions having magnets on the primary assembly. The auxiliary assembly is pivotal upwards, removing the pivotal alignment of the auxiliary and primary lenses. A significant disadvantage of this design is that it is unstable, relying on tenuous repositioning and magnetic forces alone to align and support the auxiliary assembly to the primary assembly. Another significant disadvantage of this design is that it causes the auxiliary frame to be positioned into the forehead of the wearer, making raising the auxiliary assembly fully perpendicular to the primary assembly impractical.

U.S. Pat. No. 6,301,953 to Xiao ("Xiao") discloses an auxiliary lens assembly having pivots mounted above the lenses and attached by long, L-shaped shelter arms. The shelter arms are attached to supporting arms having magnet holding housings attached at their ends. Magnets are inset in the housings for engagement over rearwardly protruding rim lockers. One disadvantage of this design is that it fails to limit the rotation of the auxiliary lens assembly. Another disadvantage is that it is aesthetically unappealing, due in part to the long shelter arm requirement. Another disadvantage is that it relies on a bridge magnet or bride hook for stability. Another disadvantage is that the device relies on magnetic force to pull the magnetic housing forward, over a rearward protruding lens locker, requiring the user to push the auxiliary frame awkwardly rearward, into the primary frame, to disengage the magnetic housing from over the lens locker. Another disadvantage is that the device is complex and expensive to manufacture.

Each of these designs requires a lens that is limited in width to accommodate the magnets and mechanical engaging apparatus on the outside of the lenses. As a result, peripheral vision through the lens is limited. This can give rise to both convenience and safety issues. For example, a nearsighted person trying to change lanes on a freeway Is forced to rotate this or her head significantly further around to allow alignment of their eyes through the lens in the direction of the vehicle blind-spot. These processes increase the time required to effect the maneuver, and results in the increased time in which the direction in which the car is traveling at high speed is not visible. Problems occur again when trying to back up a vehicle.

The prior art magnets and mechanical engaging apparatus on the outside of the lenses used to attach the auxiliary lens assembly to the primary lens assembly typically involve extensions on the primary frames. The extensions must be large enough to accommodate magnets that are large enough to exert the necessary force to retain the auxiliary lenses in place. Similarly, the prior art auxiliary lens assembly will require extensions that, in one manner or another, protrude over the extensions of the primary frame assembly and include retainers for supporting auxiliary magnets.

The resulting disadvantage is that the prior art design for primary and auxiliary lens assemblies involve delicate soldering of numerous extraneous parts which extend from the sides of the lens assemblies. The only purpose of the several extraneous parts is to support the magnets and/or mechanical engagement of the auxiliary frame assembly to the primary frame assembly.

U.S. Pat. No. 4,070,103 to Meeker discloses, eyeglasses having attachable pairs of lens rim covers. The lens rims are made of magnetizable material. A magnetic strip is provided in a groove on the inside surface of the lens cover. When the lens rim cover is placed on the rim, it is magnetically supported. A disadvantage of this invention is that the magnetic band made of conventional magnet materials is bulky and heavy, and the entire assembly is overly complicated. Also, band-like magnetic materials must be ductile enough to prevent breakage, and thus the compositions of the magnetic materials suitable for use is limited.

U.S. Pat. No. 5,786,880 to Chao discloses a spectacle, or eyeglass, frame including a primary frame and a secondary frame having one or more magnetizable members embedded within the eyeglass frame prior to magnetizing the members. The magnetizable members are then electroplated, painted, and magnetized with a magnetizing machine, such as an electromagnetic machine. A disadvantage of this design is that the resulting eyeglass frame is relatively bulky and the discrete magnets made of conventional materials lack sufficient power and life to support the auxiliary lens assembly to the primary lens assembly.

U.S. Pat. No. 6,412,942 to McKenna and Smith ("McKenna") discloses one embodiment where a heat-treated magnetic alloy auxiliary frame assembly configured to magnetically couple the auxiliary lens assembly to the primary lens assembly is employed. Heat treating of a spinodal decomposition alloy magnetizes the alloy and, therefore, the auxiliary frame is formed entirely from a magnetic alloy. The disadvantage of this design is in the manufacture cost and challenges associated with heat treating a thin metal frame, as well as the lack of strength and life of the magnetic field.

McKenna, in another embodiment, discloses an auxiliary frame that is at least formed from a magnetic alloy, wherein the alloy is uniformly distributed throughout the auxiliary frame. Specifically, McKenna emphasizes uniformity of magnetic material throughout the auxiliary lens as an advantage over the use of discrete components. However, there are disadvantages associated with employing uniformly distributed magnetic materials throughout the auxiliary lens assembly. In particular, the cost of metallurgy associated with the manufacture of uniformly distributing magnetic materials can be high.

U.S. Pat. No. 6,331,057 to Strube ("Strube") discloses a clip-on option for the auxiliary lens assembly in which the auxiliary lens assembly is held by small but powerful cylindrical magnets made of zinc-coated neodymium, located in the auxiliary bridge region and the primary bridge region. The magnetic material is disclosed as preferred for its superior remanence and coercivity.

It can thus be seen that there is a need to develop a design for a combined lens assembly which is attachable without the numerous extraneous parts and soldered assemblies of traditional designs, which encumber their appearance and limit the lens width. There is also a need to provide such a device that permits insertion of wider lenses to improve peripheral vision. There is also a need to provide a system capable of magnetic support in which the magnetic force is sufficient to support attachment of the auxiliary lens assembly to the primary lens assembly without the requirement of coextensively aligned mechanical engagement. There is also a need to simplify the structure and assembly of primary lens assemblies. There is also a need to provide a magnetically attached auxiliary lens assembly that is light-weight. There is also a need to provide an auxiliary lens assembly that is easily attachable to the primary frame assembly, without the need to maneuver extraneous component assemblies into engagement.

SUMMARY OF THE INVENTION

A primary advantage of the present invention is that it permits utilization of wider lenses to improve peripheral vision and appearance. Another advantage of the present invention is that it does not require mechanical interlocking engagements to prevent disassociation of the auxiliary lens assembly from the primary lens assembly.

Another advantage of the present invention is that it is less expensive to manufacture. Another advantage of the present invention is that it provides a simplified and improved alignment between the auxiliary lens assembly and the primary lens assembly. Another advantage of the present invention is that it provides a magnetic system that does not require electroplating or other coating. Another advantage of the present invention is that it provides a magnetic alignment that increases the magnetic attachment.

Another advantage of the present invention is that it provides a micromagnetic system that is aesthetically appealing and light-weight. Other advantages of the present invention will become apparent from the following description, taken in connection with the accompanying drawings, wherein, by way of illustration and example, an embodiment of the present invention is disclosed.

As referred to hereinabove, the "present invention" refers to one or more embodiments of the present invention which may or may not be claimed, and such references are not intended to limit the language of the claims, or to be used to construe the claims in a limiting manner.

In accordance with one aspect of the invention, there is provided an eyewear system, having a primary lens assembly. The primary lens assembly includes a primary frame for retaining a pair of primary lenses in fixed relationship. The primary frame is made of magnetically attractable material. The primary frame has a front and a back. The back of the primary frame is proximate to the face of the person wearing the primary lens assembly. The front of the primary frame faces away from the wearer.

An auxiliary lens assembly is also provided. The auxiliary lens assembly retains a pair of auxiliary lenses in fixed relationship. The auxiliary frame has a front and a back. When the auxiliary lens assembly is attached to the primary lens assembly, the back of the auxiliary frame is proximate to the front of the primary frame. The front of the auxiliary frame faces away from the wearer.

In the preferred embodiment, the back of the auxiliary frame has a plurality of slots. Micromagnets are located in the slots. In the preferred embodiment, an adhesive secures the micromagnets in the slots of the auxiliary frame. When the auxiliary frame is placed in close alignment with the primary frame, the micromagnets exert an attractive magnetic force on the magnetically attractable material of the primary frame, securing the auxiliary lens assembly against the primary lens assembly.

In a more preferred embodiment, the micromagnets are made of a Rare-Earth 2 Transition Element having a Maximum Energy Product of at least 210 kJ/m$^3$. In a still more preferred embodiment, the micromagnets are made of an alloy comprising between 22 and 29 percent by weight samarium.

In an alternative embodiment, multiple micromagnets are located in a single slot. In a variation of this embodiment, at least two micromagnets are located in close proximity, with common magnetic poles located in end-to-end alignment, as shown:

S—N N—S

The auxiliary lens assembly may be attached to the primary lens assembly. In this manner, the person wearing the eyewear system has two lenses combining to alter the transmission of light to each eye.

In a preferred embodiment, the primary lenses are corrective lenses and the auxiliary lenses are light transmission reducing lenses, for example, a polarizing, absorbing, refracting, photochromatic, or reflecting lense, or any combination thereof (i.e., sunglasses). In a preferred embodiment, the primary lenses are impact resistant safety lenses and the auxiliary lenses are light transmission reducing lenses, such as welding lenses. In another preferred embodiment, the primary lenses are corrective lenses and the auxiliary lenses are corrective lenses. In another preferred embodiment, the primary lenses are corrective lenses and the auxiliary lenses are impact resistant safety lenses.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 5 is a rear break-out view of the auxiliary lens assembly of the present invention, illustrating slots and micromagnets located in the back of the auxiliary frame.

FIG. 6 is a side-sectional view as indicated in FIG. 3, and illustrates the relationship between the primary frame and auxiliary frames when the primary and auxiliary lens assemblies are attached.

DETAILED DESCRIPTION OF THE PREFERRED EMBODIMENTS

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The terms "right" and "left" as may be used herein are referenced from the perspective of a person wearing the primary and auxiliary lens assemblies. The references are intended to aide in the description of the device, and are not intended to be limiting, since the preferred embodiments of the device are generally symmetric.

Figure 1:
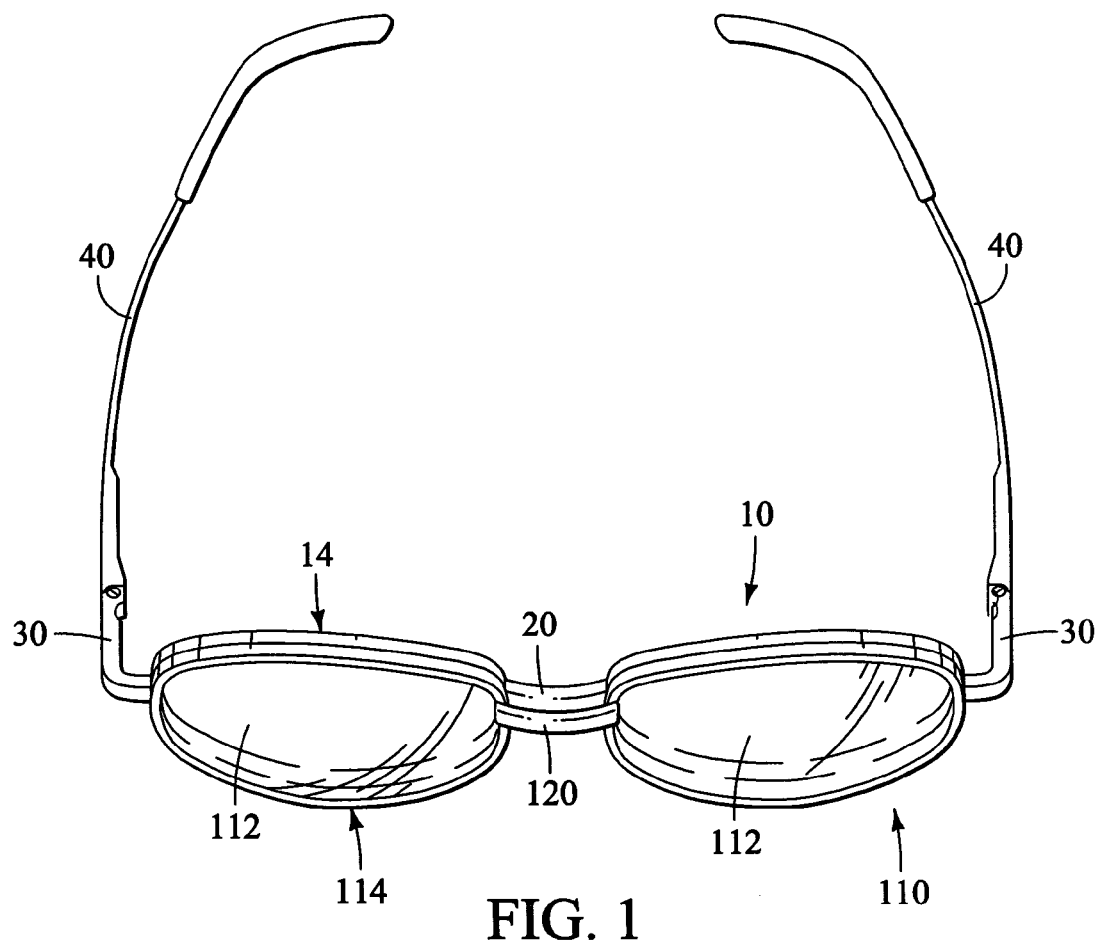
FIG. 1 is an isometric view of an auxiliary lens assembly attached to a primary lens assembly in accordance with a preferred embodiment of the present invention.

FIG. 1 is an isometric view of a preferred embodiment of the present invention. In this view, a primary lens assembly 10 is illustrated with an auxiliary lens assembly 110 attached.

Figure 2:
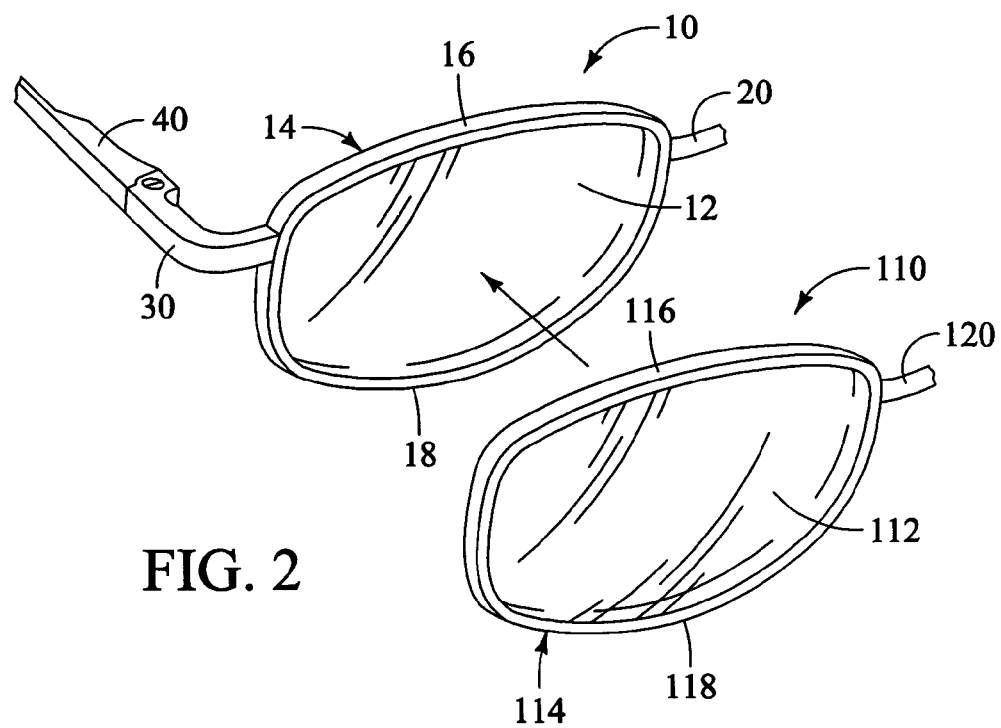
FIG. 2 is an isometric breakout view illustrating the auxiliary lens assembly being connected to the primary lens assembly.

FIG. 2 is an isometric breakout view illustrating the auxiliary lens assembly 110 secured to the primary lens assembly 10. Primary lens assembly 10 has a pair of primary lenses 12 secured in a primary frame 14. Primary frame 14 has an upper portion 16. In a preferred embodiment, primary frame 14 also has a lower portion 18. Primary frame 14 has a primary bridge 20 that secures primary lenses 12 in a fixed position relative to one another.

As seen in FIG. 1 and FIG. 2, primary frame 14 has a front 22 and a back 24. Back 24 of primary frame 14 is proximate to the face of the person wearing primary lens assembly 10. Front 22 of primary frame 14 faces away from the wearer. A pair of extensions 30 extend rearward from primary frame 14 in the general direction of the person wearing primary lens assembly 10. An arm 40 is pivotally attached to each extension 30 for supporting primary lens assembly 10 on the head of the wearer.

Still referring to FIG. 2, auxiliary lens assembly 110 is also illustrated. Auxiliary lens assembly 110 has a pair of auxiliary lenses 112 secured in an auxiliary frame 114. Auxiliary frame 114 has an upper portion 116. In a preferred embodiment, auxiliary frame 114 may also have a lower portion 118. Auxiliary frame 114 has an auxiliary bridge 120 that secures auxiliary lenses 112 in a fixed position relative to one another.

Auxiliary frame 114 has a front 122 and a back 124. Back 124 of auxiliary frame 114 is positioned proximate to front 22 of primary lens assembly 10. Front 122 of auxiliary frame 114 faces away from the wearer.

Figure 3:
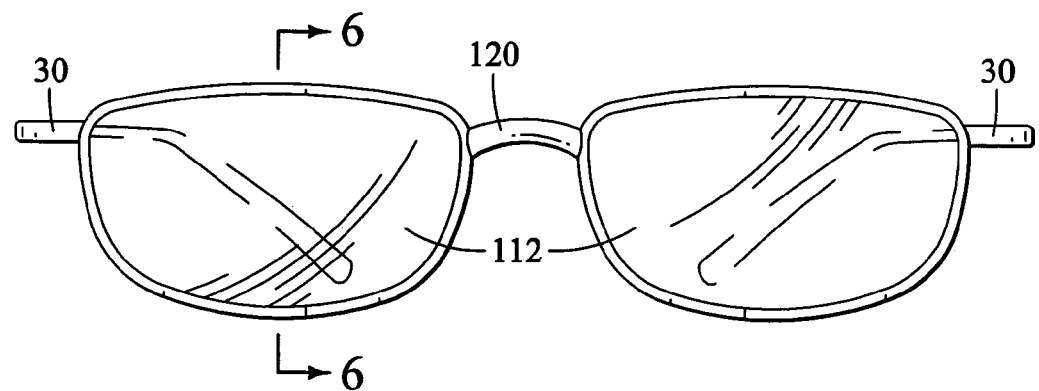
FIG. 3 is a front view of an auxiliary lens assembly attached to a primary lens assembly in accordance with a preferred embodiment of the present invention.
Figure 4:
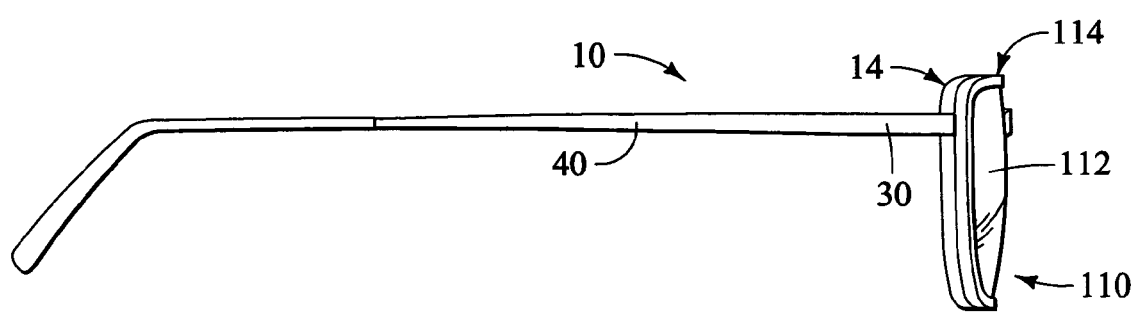
FIG. 4 is a side view of the auxiliary lens assembly and primary lens assembly illustrated in FIG. 3.

FIG. 3 is a front view of auxiliary lens assembly 110 attached to primary lens assembly 10. FIG. 4 is a side view of auxiliary lens assembly 110 attached to primary lens assembly 10 illustrated in FIG. 3. As seen in FIG. 3 and FIG. 4, when primary lens assembly 10 and auxiliary lens assembly 110 are combined, primary lenses 12 and auxiliary lenses 112 are in substantial alignment.

FIG. 5 is a rear break-out view of auxiliary lens assembly 110 of the present invention. In this view, it is seen that auxiliary lens assembly 110 has slots 130 located in back 124 of auxiliary frame 114. Micromagnets 140 are located in slots 130. Adhesives are commercially available and well known in the art for attaching magnets into slots in eyewear. The same adhesives are applicable for use with micromagnets 140 in slots 130.

Micromagnets 140 are not typically formed by being pressed into individual magnets. Because of their small size, micromagnets are magnets that are pressed into blocks larger than the final desired size. The larger, pressed magnets are then sectioned to the desired size. Conventional specifications for the sizes of such micromagnets that have consistent magnetic properties are 3 mm wide by 1 mm long by 0.5 mm thick, where the thickness is in the direction of force.

In a more preferred embodiment, the micromagnets are made of a Rare-Earth 2 Transition Element having a Maximum Energy Product of at least 210 kJ/m$^3$. In a still more preferred embodiment, the micromagnets are made of an alloy comprising between 22 and 29 percent by weight samarium. Other alloys can also be employed, such as those magnets formed of Rare Earth Cobalt 5 alloys, Rare Earth Iron alloys, and International Electrotechnical Commission (IEC) Code Reference R4-1 materials.

FIG. 6 is a side-sectional view as indicated in FIG. 3, and illustrates the relationship between primary frame 14 and auxiliary frame 114 when primary lens assembly 10 and auxiliary lens assembly 110 are attached. As seen in this view, front 22 of primary frame 14 is in contact and substantial alignment with back 124 of auxiliary frame 114, allowing and resulting from magnetic engagement between micromagnets 140 and primary frame 14.

Figure 7:
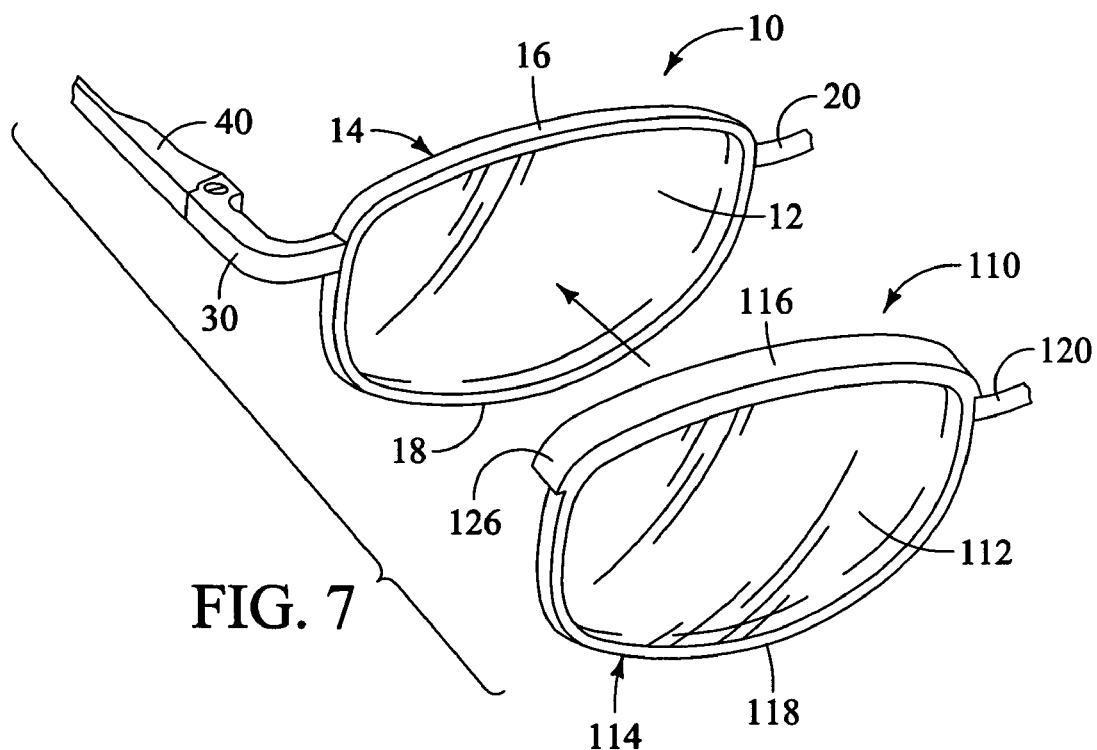
FIG. 7 is an isometric breakout view of another embodiment of the present invention, illustrating the auxiliary lens assembly having a shelf extending out of the back of the upper portion of the auxiliary frame.
Figure 7A:
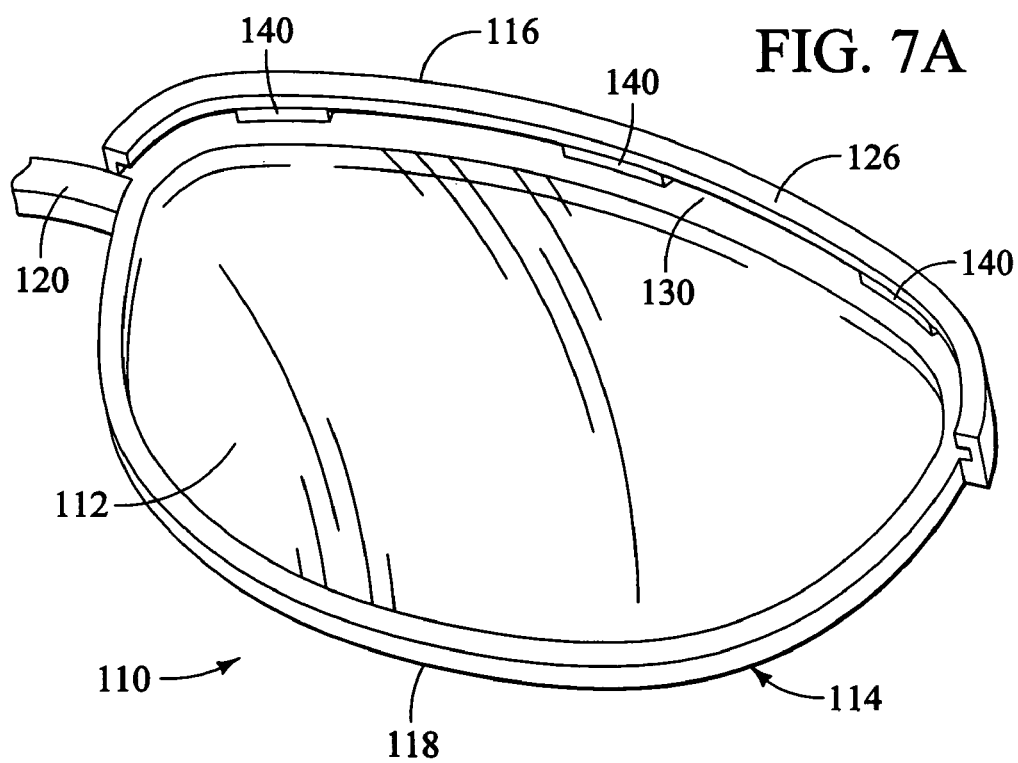
Figure 8:
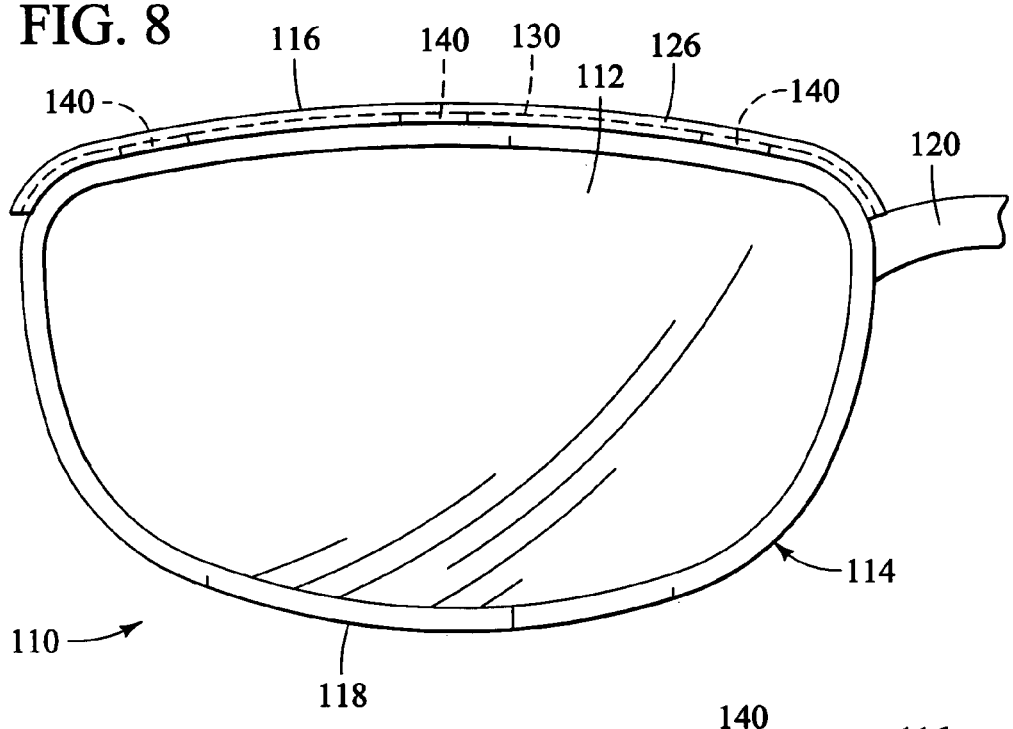
FIG. 8 is a rear break-out view of the auxiliary lens assembly of the present invention, illustrating a slot and micromagnet located in the shelf of the auxiliary frame.

FIG. 7 is an isometric breakout view of an alternative embodiment of the present invention, illustrating auxiliary lens assembly 110 having a shelf 126 extending from upper portion 116 of auxiliary frame 114 in a rearward direction toward the face of the wearer. FIG. 8 is a rear break-out view of auxiliary lens assembly 110 illustrated in FIG. 7. In this embodiment, slots 130 and micromagnets 140 are located in shelf 126 of auxiliary frame 114.

Figure 9:
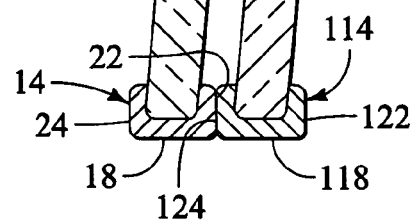
FIG. 9 is a side-sectional view of an embodiment illustrated in FIGS. 7 and 8, and illustrating the relationship between the primary frame, auxiliary frame, and shelf, when the primary and auxiliary lens assemblies are attached.

FIG. 9 is a side-sectional view of one embodiment illustrated in FIGS. 7 and 8 and described above. In this view, auxiliary lens assembly 110 is shown attached to primary lens assembly 10. Also in this view, it can be seen that shelf 126 mechanically engages with the upper portion 16 of primary frame 14 to provide additional resistance to undesired disengagement when vertical separating forces are encountered. It is also seen in this view that micromagnets 140 can be located in either shelf 126 or back 124 of upper portion 116 of auxiliary frame 114. Alternatively, micromagnets 140 can be located in both places.

Figure 10:
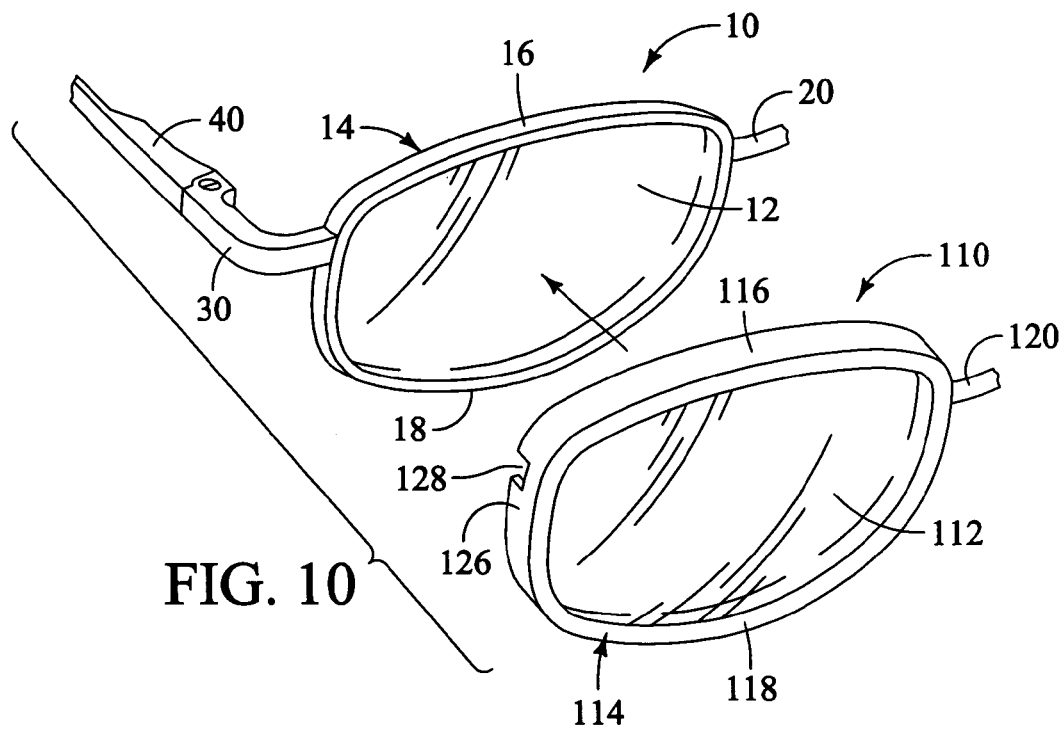
FIG. 10 is an isometric breakout view of another embodiment of the present invention, illustrating the auxiliary lens assembly having a shelf extending out of the majority of the perimeter of the back of the auxiliary frame, and having a relief for accommodation of the extension of the primary frame of the primary lens assembly.
Figure 11:
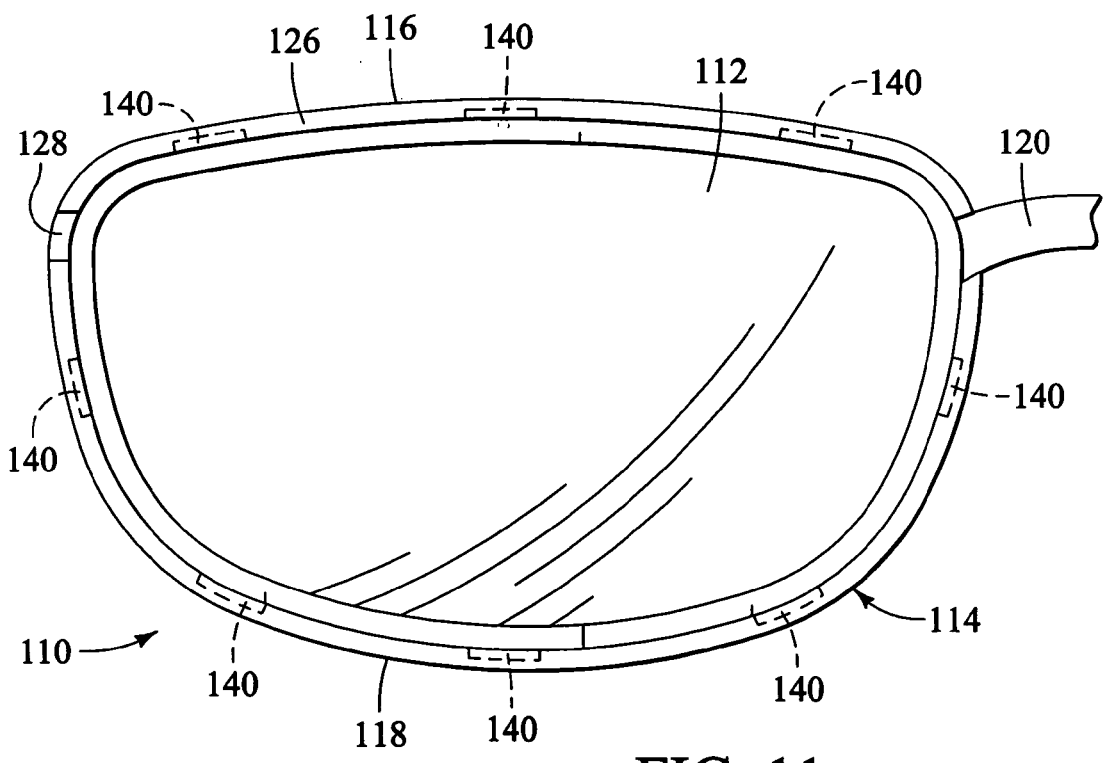
FIG. 11 is a rear break-out view of the auxiliary lens assembly of the present invention, illustrating slots and micromagnets located in the back of the auxiliary frame.

FIG. 10 is an isometric breakout view of another embodiment of the present invention, illustrating auxiliary lens assembly 110 having shelf 126 extending from a majority of the perimeter of auxiliary frame 114 in a rearward direction toward the face of the wearer. A relief 128 accommodates extension 30 of primary frame 14 of primary lens assembly 10. FIG. 11 is a rear break-out view of auxiliary lens assembly 110 of the present invention, illustrating slots 130 and micromagnets 140 located in back 124 of auxiliary frame 114.

Figure 12:
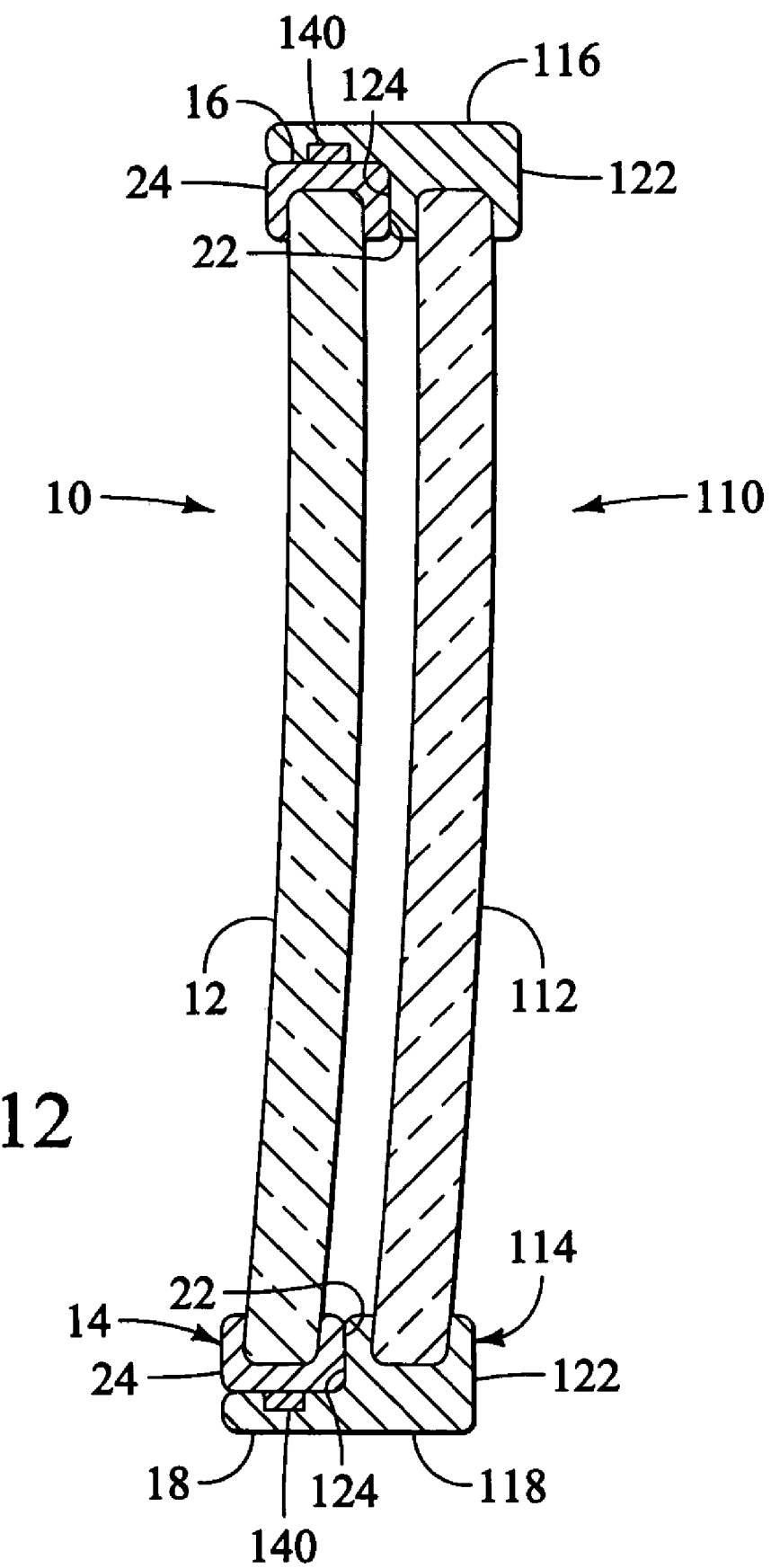
FIG. 12 is a side-sectional view (as indicated in FIG. 3 in another embodiment), and illustrating the relationship between the primary frame, auxiliary frame, and perimeter surrounding shelf, when the primary and auxiliary lens assemblies are attached.

FIG. 12 is a side-sectional view of the embodiment illustrated in FIGS. 10 and 11, illustrating the relationship between primary frame 14, auxiliary frame 114, and perimeter surrounding shelf 126, when primary and auxiliary lens assemblies 10 and 110 are attached.

Figure 13:
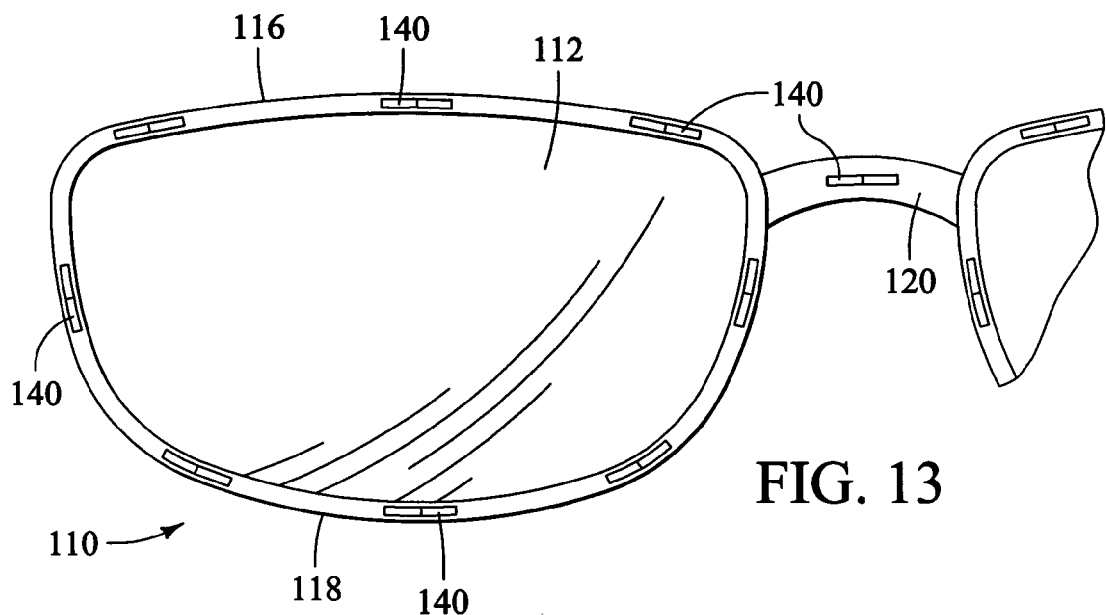
FIG. 13 is a rear break-out view of an alternative embodiment of the auxiliary lens assembly of the present invention, illustrating slots and micromagnets located in the back of the auxiliary frame, in which micromagnets are paired together with common poles located matched in close proximity.
Figure 14:
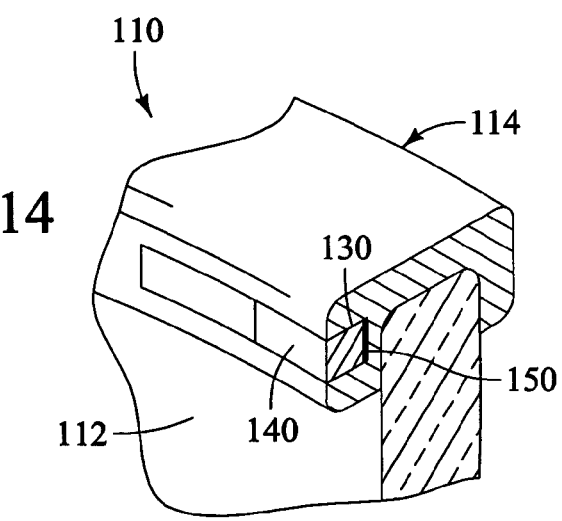
FIG. 14 is a sectional break-out view of the embodiment disclosed in FIG. 13.

FIG. 13 is a rear break-out view of an alternative embodiment of auxiliary lens assembly 110 of the present invention. FIG. 14 is a sectional break-out of the embodiment disclosed in FIG. 13. Slots 130 and micromagnets 140 are illustrated located in back 124 of auxiliary frame 114. As seen in this view for this embodiment, micromagnets 140 are paired together. Also, micromagnets 140 are orientated such that common poles are located in matched proximity.

Figure 15:
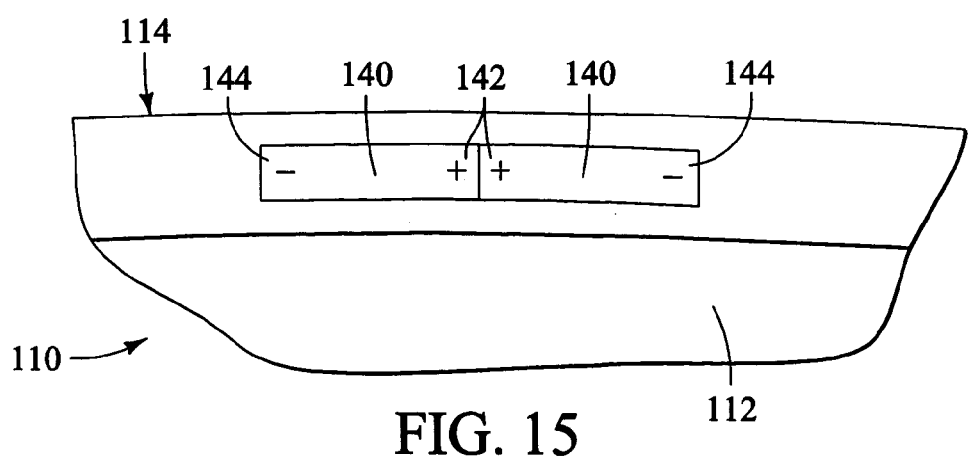
FIG. 15 is a rear break-out view of the embodiment disclosed in FIG. 14.

FIG. 15 is a rear break-out of the embodiment disclosed in FIG. 14. As illustrated in FIG. 15, multiple micromagnets are located in a single slot. In a preferred variation of this embodiment, two micromagnets 140 are located in close proximity, with common magnetic poles located in end-to-end alignment, for example as shown:

S—N N—S

As can be seen in FIG. 15, north poles 142 of micromagnets 140 are adjacent one another while south poles 144 of micromagnets face away. Specifically, end-to-end alignment of common poles would allow for increased strength over more conventional end-to-end alignment of uncommon poles.

Moreover, any combination of micromagnets used singularly, or in combination, can be employed in any embodiment described hereinabove.

The preferred embodiments of primary frame 14 and auxiliary frame 114 illustrated surround the entire perimeter of primary lenses 12 and auxiliary lenses 112, respectively. Alternatively, primary frame 14 may only partially surround the perimeter of primary lenses 12. Likewise, auxiliary frame 114 may only partially surround the entire perimeter of auxiliary lenses 112. Such configurations are known in the industry as "open edge."

The auxiliary lens assembly may be attached to the primary lens assembly. In this manner, the person wearing the eyewear system has two lenses combining to alter the transmission of light to each eye.

In a preferred embodiment, the primary lenses are corrective lenses and the auxiliary lenses are light transmission reducing lenses, for example, a polarizing, absorbing, refracting, photochromatic, or reflecting lenses, or any combination thereof (i.e., sunglasses). In a preferred embodiment, the primary lenses are impact resistant safety lenses and the auxiliary lenses are light transmission reducing lenses, such as welding lenses. In another preferred embodiment, the primary lenses are corrective lenses and the auxiliary lenses are corrective lenses. In another preferred embodiment, the primary lenses are corrective lenses and the auxiliary lenses are impact resistant safety lenses.

OPERATION OF THE PREFERRED EMBODIMENTS

The various embodiments disclosed herein which include magnetic attraction will be appreciated by one of ordinary skill in the art to involve a combination of magnet-to-magnet magnetic engagement, or magnet-to-magnetic material magnetic engagement. "Magnetic material" as used herein is defined as materials subject to attraction by magnetic force, or magnetically attractable.

Referring to FIGS. 1 and 2 of the drawings, the reference numeral 10 generally refers to a primary lens assembly. Primary lens assembly 10 comprises a primary frame 14 formed of an upper portion 16 and a lower portion 18 that supports a pair of primary lenses 12. Primary lenses 12 are then held in a fixed position relative to one another by a primary bridge 20. Typically, primary lenses 12 are fixed in a position to cover the eyes of a wearer with primary bridge 20 resting in a position above the nose. Also, during usage, front 22 of the primary frame 14 faces away from the wearer while a back 24 of the primary frame 14 is proximate the face of the wearer.

In order to assist primary lens assembly 10 to remain in a fixed position on a wearer's face, additional attachment assemblies are employed. The additional attachment assemblies are usually extensions 30 and arms 40 that extend from the edges of primary frame 14 that fit over the ears of the wearer. On the primary lens assembly 10, extensions 30 extend rearward from the edges of primary frame 14 in the direction of the face of a wearer. Arms 40 are then pivotally attached to each of extensions 30 so that when in use, arms 40 rest over the ears of the wearer. Arms 40 can also be folded in a direction approximately parallel to the fixed positions of primary frames 14 when not in use to prevent damage.

In the preferred embodiment of the present invention, primary frames 14 are comprised of a magnetically attractable material, so that additional lens assemblies can be magnetically coupled to the primary frame 10. The magnetically attractable material can be any one of several magnetically attractable materials including, but not limited to, ferromagnetic materials.

Specifically, in FIGS. 1 and 2, an auxiliary lens assembly 110 couples to front face 22 of primary lens assembly 10. Auxiliary lens assembly 110 comprises auxiliary frames 114 formed of an upper portion 116 and a lower portion 118 to provide a mechanical support platform for auxiliary lenses 112. Auxiliary frame 114 also employs an auxiliary bridge 120 that secures auxiliary lenses 114 in a fixed position relative to one another.

Auxiliary frame 114 has a front 122 and a back 124. During use, front 122 of auxiliary frame 114 faces away from the wearer, and back 124 of auxiliary frame 114 is adjacent to back 24 of the primary frame 14.

Referring to FIG. 3 of the drawings, a front view of auxiliary lens assembly 110 attached to primary lens assembly 10 in accordance with a preferred embodiment of the present invention is shown. FIG. 4 is a side view of auxiliary lens assembly 110 attached to primary lens assembly 10 illustrated in FIG. 3. As seen in FIG. 3, when primary lens assembly 10 and auxiliary lens assembly 110 are combined, auxiliary lenses 112 and primary lenses 12 are in substantial alignment.

FIG. 5 illustrates a rear break-out view of auxiliary lens assembly 110 of a preferred embodiment of the present invention. In the preferred embodiment of FIG. 5, individual micromagnets are employed to provide the necessary coupling force. In this view, it is seen that auxiliary lens assembly 110 has slots 130 located in back 124 of auxiliary frame 114. Micromagnets 140 are then located in slots 130. Adhesives are commercially available and well known in the art for attaching magnets into slots in eyewear. The same adhesives are applicable for use with micromagnets 140 in slots 130.

In prior art eyewear designs incorporating auxiliary lens assemblies, it is common for the extensions to extend substantially outwards from the edges of the primary frame before turning rearwards in the direction of the face of a wearer. The outward component of the extensions is used to accommodate mechanical attachments and/or traditional magnets for attachment of the auxiliary lens assembly to the primary lens assembly. In the present design, extensions 30 may extend directly rearward, and not outward, thus enabling outward enlargement of primary lenses 12 and auxiliary lenses 112, improving the peripheral visibility through both primary lens assembly 10 and auxiliary lens assembly 110. Additional, this improves the aesthetic appeal of both primary lens assembly 10 and auxiliary lens assembly 110.

Micromagnets 140 are not typically formed by being pressed into individual magnets. Because of their small size, micromagnets are magnets that are pressed into blocks larger than the final desired size. The larger, pressed magnets are then sectioned to the desired size. Conventional specifications for the sizes of such micromagnets that have consistent magnetic properties are 3 mm wide by 1 mm long by 0.5 mm thick, where the thickness is in the direction of force. Conventional magnets of the type used in the eyewear industry require electroplating to prevent oxidation. Electroplating of such small magnets results in a material phenomenon known as "boning" in which the ends of the small magnets are enlarged by the aggregate plating material. This phenomenon prevents close tolerance assembly of magnets within slots, as well as close proximity alignment of micromagnets end-to-end. It also increases the manufacturing costs.

In a preferred embodiment, the micromagnets 140 are made of a Rare-Earth 2 Transition Element having a Maximum Energy Product of at least 210 kJ/m$^3$. In a still more preferred embodiment, micromagnets 140 are made of an alloy comprising between 22 and 29 percent by weight samarium. Other alloys can also be employed, such as those magnets formed of Rare Earth Cobalt 5 alloys, Rare Earth Iron alloys, and International Electrotechnical Commission (IEC) Code Reference R4-1 materials. The advantage of using these materials is that they resist oxidation and need not be electroplated, while providing exceptionally powerful magnetic fields. As a result, these materials can be used to produce close tolerance assembly of magnets within slots, as well as close proximity alignment of micromagnets end-to-end.

FIG. 6 shows a side-sectional view of the preferred embodiment of FIG. 5, as indicated in FIG. 3. Specifically, FIG. 6 illustrates the relationship between primary frame 14 and auxiliary frame 114 when primary lens assembly 10 and auxiliary lens assembly 110 are attached. As seen in this view, front 22 of primary frame 14 is in contact and substantial alignment with back 124 of auxiliary frame 114. The force required to maintain contact between primary frame 14 and auxiliary frame 114 is provided by the magnetic coupling between the micromagnets 140 and the magnetically attractable material of primary frame 14.

Thus, the preferred embodiments illustrated in FIGS. 5 and 6 provide a means for easily coupling auxiliary frames 114 to primary frames 14. In particular, a wearer can easily couple the auxiliary frame 114 to the primary frame 14 with a single hand while maintaining aesthetic continuity between desired lens conditions.

In yet another preferred embodiment of the present invention, FIG. 7 shows an isometric breakout view, illustrating auxiliary lens assembly 110 having a shelf 126. FIG. 8 is a rear break-out view of auxiliary lens assembly 110 illustrated in FIG. 7, further disclosing the location of micromagnets 140 in a slot 130. In this preferred embodiment, shelf 126 extends from upper portion 116 in a direction toward the face of the wearer. Within shelf 126 are one or more slots 130 with micromagnets 140 located therein. When auxiliary lens assembly 110 is attached to primary lens assembly 10, shelf 126 engages upper portion 16 of primary frame 14 to provide mechanical support.

The combined usage of the primary lens assembly 10 and the auxiliary lens assembly 110 can best be seen by the side-sectional view of FIG. 9. FIG. 9 shows the preferred embodiment illustrated in FIGS. 7 and 8. In FIG. 9, auxiliary lens assembly 110 is shown attached to primary lens assembly 10. Shelf 126 mechanically engages upper portion 16. Micromagnets 140 magnetically couple auxiliary lens assembly 114 to the magnetically attractable material of primary frame 14. Shelf 126 mechanically engages upper portion 16 to provide additional resistance to undesired disengagement when vertical separating forces are encountered. Therefore, this preferred embodiment is better capable of preserving alignment of primary lens assembly 10 and auxiliary lens assembly 110. It is also preferable to place micromagnets 140 in either shelf 126 or back 124 of upper portion 116. Alternatively, micromagnets 140 can be located in both places.

In yet another preferred embodiment of the present invention, FIG. 10 depicts an isometric breakout view illustrating auxiliary lens assembly 110 having shelf 126 extending from a majority of auxiliary frame 114. In particular, shelf 126 is formed along the majority of the perimeter of upper portion 116 and lower portion 118. Reliefs 128 are present in shelf 126 to accommodate extensions 30 of primary frame 14.

In another view of this preferred embodiment, FIG. 11 is a rear break-out view of auxiliary lens assembly 110 of the present invention, illustrating slots 130 and micromagnets 140 located in back 124 of auxiliary frame 114. The combination of primary lens assembly 10 and auxiliary lens assembly 110 in this embodiment is best seen in the side-sectional view of FIG. 12, which depicts a side-sectional view of FIGS. 10 and 11.

In FIG. 12, auxiliary lens assembly 110 is shown attached to primary lens assembly 10. Shelf 126 mechanically engages upper portion 16 and lower portion 18. Micromagnets 140 magnetically couple auxiliary lens assembly 114 to the magnetically attractable material of primary frame 14. Shelf 126 mechanically engages upper portion 16 and lower portion 18 to provide additional resistance to undesired disengagement when vertical and/or horizontal separating forces are encountered. Therefore, this preferred embodiment is better capable of preserving alignment of primary lens assembly 10 and auxiliary lens assembly 110. It is also preferable to place micromagnets 140 in either shelf 126 or back 124 of upper portion 116. Alternatively, micromagnets 140 can be located in both places.

In a more preferred embodiment, FIG. 13 depicts a rear break-out view of auxiliary lens assembly 110 illustrating slots 130 and micromagnets 140 located in back 124 of auxiliary frame 114. As seen in this view, micromagnets 140 are paired together. In particular, micromagnets 140 are orientated such that common poles are located in matched proximity. FIG. 14 is a sectional break-out of the embodiment disclosed in FIG. 13.

In the embodiment depicted in FIG. 15, multiple micromagnets are located in a single slot. In a variation of this embodiment, at least two micromagnets are located in close proximity, with common magnetic poles located in end-to-end alignment, for example as shown:

S—N N—S

As can be seen in FIG. 15, north poles 142 of micromagnets 140 are adjacent one another while south poles 144 of micromagnets face away. Specifically, end-to-end alignment of common poles would allow for increased strength over more conventional end-to-end alignment of uncommon poles. The unplated materials of the micromagnets 140 of the above disclosed embodiments permit maximizing the proximity of micromagnets 140 and therefore of resultant magnetic force. This is very beneficial when utilizing very small magnets.

Moreover, any orientation of micromagnets 140 used singularly, or in combination, can be employed in any embodiment described hereinabove. It is also possible to electroplate the preferred micromagnet 140 materials disclosed above.

The preferred embodiment of primary frame 14 and auxiliary frame 114 illustrated in FIG. 12 surrounds the majority of the perimeter of primary lenses 12 and auxiliary lenses 112, respectively. Alternatively, primary frame 14 may only partially surround the perimeter of primary lenses 12. Similarly, auxiliary frame 114 need only partially surround the perimeter of auxiliary lenses 112. Such configurations are known in the industry as "open edge."

It will be readily apparent to those skilled in the art, and the general principles defined herein may be applied to other embodiments and applications without departing from the spirit and scope of the present invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

I claim:

1. An eyewear system comprising:
   a primary frame adapted to support a pair of primary lenses in fixed relationship, the primary frame made of magnetically attractable material;
   an auxiliary frame adapted to support a pair of auxiliary lenses in fixed relationship, the auxiliary frame comprising a front and a back;
   a plurality of slots located in the back of the auxiliary frame;
   a plurality of micromagnets located in the slots; and,
   at least two micromagnets being positioned in an end-to-end relationship with their common poles adjacent to one another.

2. The eyewear system of claim 1, wherein the micromagnets are micromagnets formed of a Rare-Earth 2 Transition Element having a Maximum Energy Product of at least 210 kJ/m3.

3. The eyewear system of claim 1, wherein the micromagnets are formed of a material selected from the group consisting of Rare Earth Cobalt 5 alloys and Rare Earth Iron alloys.

4. The eyewear system of claim 1, wherein the micromagnets further comprising micromagnets formed of an International Electrotechnical Commission (IEC) Code Reference R4-1 material.

5. The eyewear system of claim 1, wherein the micromagnets further comprise micromagnets formed of an alloy comprising between 22 and 29 percent by weight samarium.

6. The eyewear system of claim 1, wherein the micromagnets are less than approximately 0.55 millimeters in height, less than approximately 0.55 millimeters in width, and being at least 1.2 millimeters in length.

7. The eyewear system of claim 1, wherein the micromagnets are approximately 0.45 millimeters in height, less than approximately 0.45 millimeters in width.

8. The eyewear system of claim 1, wherein the micromagnets are approximately 0.45 millimeters in height, approximately 0.45 millimeters in width, and approximately 2 millimeters in length.

9. An eyewear system comprising:
   a primary frame adapted to support a pair of primary lenses in fixed relationship, the primary frame made of magnetically attractable material;
   an auxiliary frame adapted to support a pair of auxiliary lenses in fixed relationship, the auxiliary frame comprising a front and a back;
   a plurality of slots located in the back of the auxiliary frame;
   a plurality of micromagnets located in the slots; and
   wherein the micromagnets are micromagnets formed of a Rare-Earth 2 Transition Element having a Maximum Energy Product of at least 210 kJ/m3.

10. The eyewear system of claim 9, wherein the micromagnets are less than approximately 0.55 millimeters in height, less than approximately 0.55 millimeters in width, and being at least 1.2 millimeters in length.

11. The eyewear system of claim 9, wherein the micromagnets are approximately 0.45 millimeters in height, less than approximately 0.45 millimeters in width.

12. The eyewear system of claim 9, wherein the micromagnets are approximately 0.45 millimeters in height, approximately 0.45 millimeters in width, and approximately 2 millimeters in length.

13. The eyewear system of claim 9, wherein at least two micromagnets are located in each slot.

14. The eyewear system of claim 13, wherein the two micromagnets are positioned in end-to-end relationship, wherein common poles of the micromagnets are adjacent to one another.

15. An auxiliary lens assembly comprising:
   an auxiliary frame adapted to support a pair of auxiliary lenses in fixed relationship, the auxiliary frame comprising a front and a back;
   a shelf extending rearward from the auxiliary frame, and being engagable over a primary frame of a primary lens assembly;
   a plurality of slots located in the shelf;
   a plurality of micromagnets located in the slots; and
   at least two micromagnets positioned in a slot in an end-to-end relationship wherein common poles of the micromagnets are adjacent to one another.

* * * * *